United States Patent
Beal

[15] 3,678,260
[45] July 18, 1972

[54] OPTICAL SYSTEM FOR AIRCRAFT GUIDANCE LIGHT

[72] Inventor: Edward W. Beal, Wethersfield, Conn.
[73] Assignee: Connecticut International Corporation, Windsor Locks, Conn.
[22] Filed: Feb. 6, 1970
[21] Appl. No.: 9,309

[52] U.S. Cl..........................240/1.2, 240/41.1, 240/41.36, 240/41.37, 240/103 R
[51] Int. Cl. ......................................B64f 1/18, F21q 3/02
[58] Field of Search..................240/1.2, 41.36, 41.37, 103 R, 240/41.1

[56] References Cited

UNITED STATES PATENTS

| | | | |
|---|---|---|---|
| 1,864,696 | 6/1932 | Steele et al.........................| 240/41.3 X |
| 2,147,679 | 2/1939 | Stanton et al...........................| 240/1.2 |
| 1,819,725 | 8/1931 | Wood...............................| 240/41.37 |
| 1,753,885 | 4/1930 | Gerhardt..........................| 240/41.37 X |
| 1,281,752 | 10/1918 | Bailey...............................| 240/41.37 |
| 2,184,004 | 12/1939 | Pennow...............................| 240/1.2 |

FOREIGN PATENTS OR APPLICATIONS

| | | | |
|---|---|---|---|
| 759,848 | 10/1956 | Great Britain..........................| 240/1.2 |

Primary Examiner—Louis R. Prince
Assistant Examiner—Frederick Shoon
Attorney—Prutzman, Hayes, Kalb & Chilton

[57] ABSTRACT

An aircraft guidance light having a reflector formed of a plurality of elliptical surfaces of revolution of different eccentricities about a common major axis are joined together at their common diameters in planes perpendicular to the axis and are displaced axially relative to each other to reflect light in the same general direction. The elliptical surfaces have a common focus and the elliptical surface of least eccentricity is nearest the common focus. A mirror is disposed at an acute angle to the common axis between the conjugate foci of the elliptical surfaces to capture and reflect the light through a side exit window in the hermetic housing of the light which contains a non-oxidizing gas at a positive pressure.

22 Claims, 5 Drawing Figures

INVENTOR.
EDWARD W. BEAL

BY Pratzman, Hayes, Kalb and Chittor
ATTORNEYS

OPTICAL SYSTEM FOR AIRCRAFT GUIDANCE LIGHT

This invention primarily relates to aircraft guidance lights and particularly to airport runway approach lights.

At the present time, airport approach lights needed to guide pilots during descent for landing on runways are generally mounted above ground level at each end of a runway. These approach lights extend for about 3,000 feet at each end of the runway and, because of the hazard presented by these above ground lights, over one mile at the ends of the runway are not available for touchdown and take-off.

With today's airplanes, the approach lights limit the tolerance for undershoot at the touchdown end of a runway and overshoot because of the limit imposed on the length of runway left at the other end of the runway for slow down and braking. The larger size airplanes of the 1970's will require longer runways than are presently provided by the useful portion of many runways, and, in many instances, additional land is unavailable at the ends of runways. This presents a problem since these larger airplanes would not be able to land at many of the airports in the United States.

An object of this invention is to provide an approach light suitable for inset runway installation to increase the useful length of a runway.

Another object of this invention is to provide an efficient low power runway approach light suitable for inset installation and having a high intensity flat profile light output.

Another object of this invention is to provide a runway aircraft guidance light incorporating a light reflector having a plurality of elliptical reflector surfaces. Included in this object is the provision of a reflector provided with two coaxial elliptical surfaces of revolution having different eccentricities joined together at a common diameter with a focal point of each positioned at substantially the same point along their common axis.

Other objects will be in part obvious and in part pointed out more in detail hereinafter.

The invention accordingly consists in the features of construction, combination of elements and arrangement of parts with will be exemplified in the construction hereafter set forth.

For the purposes of illustration, a preferred embodiment of the invention is shown in the accompanying drawing in which FIG. 1 is a cross-sectional view of an approach light made according to the invention;

Figure 1:
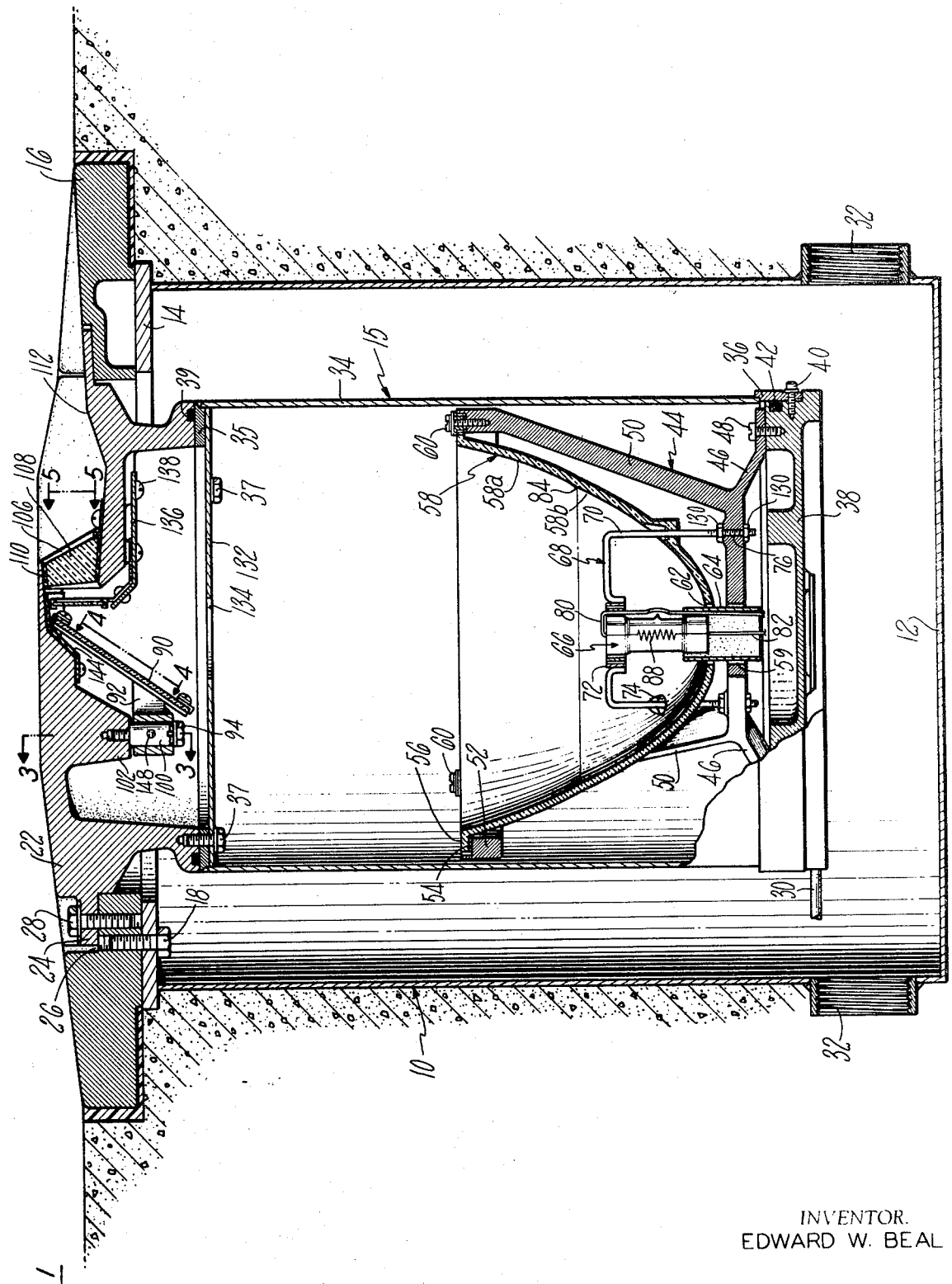

As shown in FIG. 1, the approach light comprises a housing 10 which is of generally cylindrical cross section. The housing 10 has a closed end 12 on one end and an apertured annular mounting flange 14 fixed to the other end. The housing 10 is embedded in the runway and supports a removable inner light assembly generally designated by the numeral 15. A ring support 16 is secured to the annular flange 14 by a plurality of bolts 18 and the housing 10 is embedded in the runway with the upper edge of the ring support 16 at grade level.

The removable light assembly 15 is provided with a heavy cover 22, the peripheral flange 24 of which overlies the annular recess 26 of the ring support 16 and is secured thereto by bolts 28 to mount the light assembly within the embedded can 10. A conductor 30 is connected to a supply conduit, not shown, passing through the ports 32 of the can 10 to deliver power to the unit.

The removable light assembly 15 is provided with a casing 34 which is preferably cylindrical in horizontal cross-section. The lower end of the casing 34 is provided with a depending peripheral ring 36 which serves to mount a reflector mounting base assembly 38 by a plurality of fasteners 40. A seal ring 42 is provided in a recess of the mounting base 38 to hermetically seal the same with respect to the peripheral ring 36. The upper end of casing 34 is provided with a top rim or flange 35 which is bolted at 37 to top cover 22 and sealed thereto by O-ring 39. The hermetically sealed light assembly 15 is preferably filled with an inert or nonoxidizing atmosphere such as dry nitrogen to prevent the deterioration of the optical components therein at the elevated temperature to which they are subjected in use. Desirably, such atmosphere is at a positive pressure to prevent the entry of oxygen due to breathing under operating conditions.

Mounted atop the mounting base 38 is a reflector support spider 44 having a plurality of supporting legs 46 secured to the mounting base 38 by screws 48. The spider 44 has a plurality of upwardly diverging legs 50 connected at the upper ends thereof by a rim 52 which is provided with an annular ledge 54 in which the peripheral flange 56 of the reflector 58 is placed to nest the reflector within spider 44. A plurality of fasteners 60 secure the reflector to the support spider 44.

The reflector 58 has a central aperture 62 in which is positioned an annular tube 64 for receiving a double ended quartz lamp 66.

A lamp support 68, shown as having three spaced legs 70, is provided with an upper cylindrical rim 72 which surrounds the upper end of the lamp 66. The legs 70 pass through a plurality of axial passages 74 provided in the reflector 58, and the lower ends of the legs 70 are received in apertures 76 to fix the position of the filament of the lamp 66 as hereinafter more fully described. Preferably, the ends of the lamp are respectively potted, together with the terminal wires 80 and 82 which are connected to the conductors 30 in any suitable manner (not shown) in a suitable high temperature potting compound in the tubular support members 64 and 72. The tubular member 64 is telescopically received in the annulus 59.

As shown in FIG. 1, the reflector 58 is formed of a plurality of axially connected portions of elliptical surfaces of revolution, shown as being two in number, which are coaxially disposed and have different eccentricities. The two such surface portions 58a and 58b illustrated in FIG. 1 are joined together at a common diameter 84 with the focal point of each being substantially coincident at the same axial position on their common axis.

The filament 88 is generally disposed at the substantially common focal point of the two elliptical surfaces 58a and 58b as hereinafter more fully described.

Mounted to the cover 22 of the removable light assembly 15 is a mirror 90 which is provided with a mounting support 92 secured by fasteners 94 to the bosses 96 and 98 (FIG. 3) provided on the underside of cover 22. A locator pin 100 is mounted on an intermediate boss 102 which is provided with a threaded aperture for receiving the threaded end 104 of pin 100.

The mirror 90 is of the dichroic type which redirects light energy within the visible spectrum but passes heat energy therethrough. The reflected light from the mirror passes through an exit window 106 in which a laterally elongated exit prism 108 is hermetically sealed by a suitable sealant 110. The light exiting through the prism 108 is directed up the inclined ramp 112 to provide the required light beam for aircraft guidance.

The requirements for the light beam exiting through the prism 108 is that it be centered on an axis having an upward angle of 7° relative to the horizontal with a width of 30° and a height of 10°. A further requirement is that the light have a minimum level of 20,000 candela throughout. To minimize the heat generated by a light source sufficient to produce this level of light intensity over the required beam, it is also important that the ratio of peak to minimum light intensity be minimized. That is to say, it is important that the light profile across the entire beam be relatively flat. The unique optical system of this invention which utilizes a special reflector designed to capture the normally unused light produced by the filament 88 and redirect it to reinforce the portions of the light beam exiting the fixture to provide a relatively flat profile over the required beam while limiting the variation of the intensity of the light beam to about a 2 to 1 ratio. Moreover, the reflector of this invention is capable of collecting 85 percent of the light emitted by the filament 88 so that a smaller output lamp may be used to obtain the required light beam. This also drastically reduces the heat which must be dissipated by the fixture and makes possible a significant reduction in fixture size as compared with the less efficient optical systems of present approach lights.

Figure 2:
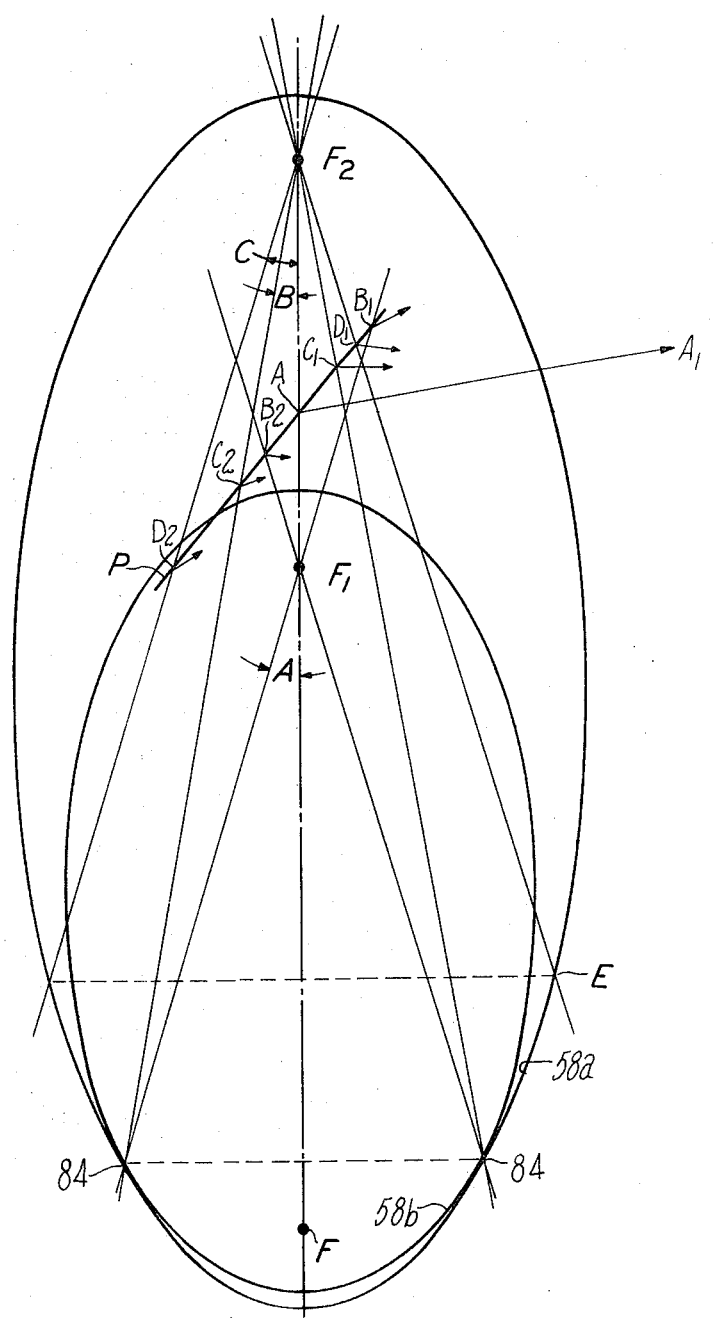
FIG. 2 is a geometric diagram of the light of FIG. 1.

Particularly referring to FIG. 2, the elliptical reflector surface 58b is formed substantially as an elliptical surface of revolution around the central axis of filament 88 and terminates at the circle 84. The filament 88 is generally centered at the focal point F of the surface 58b. Since the angle of incidence of a reflected beam of light equals the angle of reflection, the light reflected from the elliptical reflector portion 58b is reflected to the conjugate focal point $F_1$ for the reflector surface portion 58b, and the transition circle 84, which terminates the axial extent of reflector portion 58b, is selected so that the angle A made by the reflected light beam and the axis of revolution of the surface 58b is 15° to provide a light beam having the required width of 30°. In practice, the transition point 84 is selected so that the angle A is approximately 16° to 17° to provide some factor of safety in assuring a slight overlap of the reflected rays from reflector portions 58b and 58a thereby to avoid the possibility of a circular shadow in the output beam.

The filament 88 is not a point source of light but rather is a wound coil about one-half inch long with a diameter of about two-tenths inch so that the light is actually originated a distance of 0.100 inch from its axis. In practice, the radius of gyration of the reflecting surfaces of reflector 58 are preferably made about 0.100 inch greater than a true ellipse to compensate for the deviation of filament 88 from a point source and to maximize the efficiency of the reflector. Similarly, since the filament is approximately one-half inch long, in practice, the focal points of the reflector surface portions 58a and 58b may be axially spaced apart by as much as a quarter of an inch so that the light emanating from the entire filament is more efficiently utilized.

In this regard, the mounting support 68 for the quartz lamp 66 is shown as being axially adjustable with the base of the support spider by the use of adjusting nuts 130 threaded on the legs 70. This arrangement provides for the alignment of the filament 88 on the axis of reflector 58 and may also provide for its axial adjustment so that the filament may be tuned or detuned relative to elliptical reflector portions 58a, 58b to adjust the profile of the light beam. It is readily apparent that a remote controlled servo motor could be utilized to adjust the axial position of the filament 88 to adjust the light beam as desired for different conditions of visibility.

As indicated above, the elliptical surface of revolution 58a is selected so that it has a common diameter with the elliptical surface of revolution 58b at the transition circle 84. It is further selected so that its focal point is substantially coincident with the focal point F. To achieve these objectives, the ellipse forming the surface of revolution 58a has eccentricity which is greather than that of 58b and, additionally, is one which would result in the angle B of the reflected light from surface 58a at the transition circle 84 being approximately 10°. Since the light within the cone 150 (FIG. 5 may be made to have sufficient intensity when solely the result of reflected light from reflector portion 58b, such an angle B will result in the use of the reflected light from reflector portion 58a to provide the desired intensity level outside of cone 150. In order to provide a factor of safety by overlap of reflected rays of surfaces 58a and 58b at circle 84 and thereby avoid a low intensity ring in the reflected beam of light, the elliptical surface portion 58a is, in practice, selected so that the angle B is approximately 8° to 9°. The reflector portion 58a axially extends to circle E from which the reflected light makes an angle C with the axis of slightly more than 15°. If desired, a further elliptical section having a focal point falling substantially at point F and a common diameter with reflector portion 58a at circle E and a greater eccentricity than reflector portion 58a and of such a value that the angles made with its axis by light reflected from the axial ends are approximately 8° and 15°, respectively, could be used to provide for additional collection of the light from a light source at focal point F.

Since the light beam exiting the fixture has a required vertical dimension of only 10° and a horizontal dimension of 30°, it is readily apparent that in the vertical direction a substantial portion of the conical reflected light from the reflector 58 is not required to be redirected by the mirror through the exit prism. Since the light beam radiates intense heat and a limiting factor in an embedded runway light design is the surface temperature of the cover 22 which results in a deleterious effect upon aircraft tires, a light shield 132 having an aperture 134 is provided to intercept the light which is not required for the light beam exiting the fixture.

The shield plate 132 which intercepts the light is formed of a good heat conducting material to carry the heat to the edges of the cover plate 22 where it is dissipated through the cover plate and the ring support 16 by radiation. Because of manufacturing variations and tolerances, the formed aperture 134 is slightly larger than necessary in order to avoid a sharp cutoff of the light in the vertical direction which might cause the beam to be less than the required 10°. As a result, a peripheral ribbon of light is reflected by the mirror and overlaps the edges of the prism 108 and strikes the cover 22 surrounding the prism. To prevent a deleterious hot spot, a heat shield 136, mounted by fasteners 138, is disposed in spaced relationship with the cover 22 below the exit prism to intercept such overlapping light rays and to reduce the heat directed adjacent the periphery of the prism. Spacing the heat shield 136 from the cover provides an insulating barrier of air at this critical point.

As indicated above, the dichroic mirror 90 reflects light but permits the heat to pass through. Accordingly, the area of the cover 22 above the mirror is subjected to intense concentration of heat resulting from the light rays reflected by reflector 58. Since the maximum temperature of the cover 22 must be limited to a prescribed level, a formed heat dissipator 144, positioned to overlie the mirror to intercept such heat, is secured to the underside of the cover plate 22 between the abutments 96, 98 and 102 to distribute such heat and prevent an unwanted hot spot. The heat dissipator is formed of an efficient heat conducting material such as aluminum and is in intimate heat conducting relationship with the cover 22 at remote positions of the cover.

Figure 3:
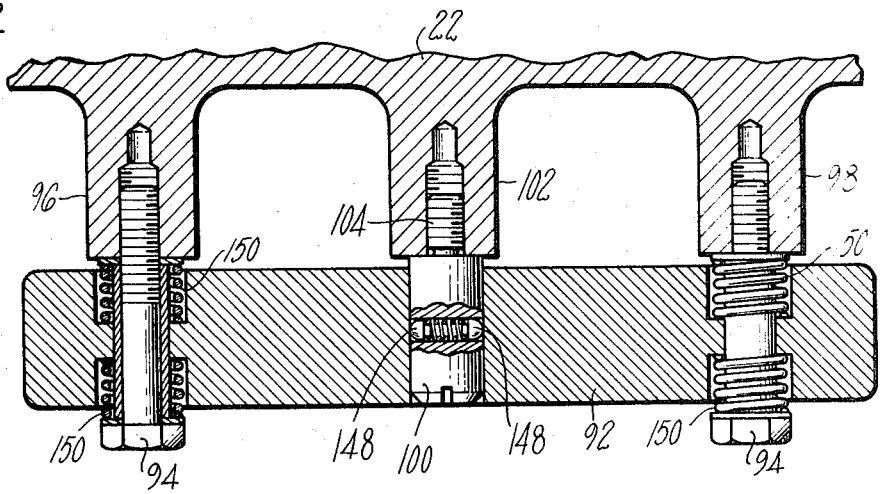
FIG. 3 is an enlarged fragmentary cross-sectional view taken along the lines 3—3 of FIG. 1.
Figure 4:
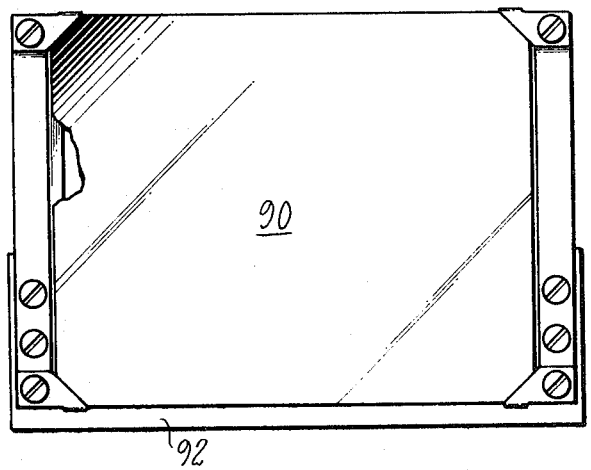
FIG. 4 is an enlarged fragmentary view taken along lines 4—4 of FIG. 1.

Since the approach light of this invention is designed for use in a runway and is subjected to the shock and vibration of snow plows used in the maintenance of runways, means are provided for isolating the dichroic mirror from chock and vibrations. As shown in FIG. 3, the aligning pin 100 is provided with a pair of spring biased friction elements 148 which, together with the opposed spring members 150 on the fasteners 94 accommodate damped relative axial movement of the support 92 relative to the aligning pin 100 and fasteners 94 so that the mirror 90 is protected from mechanical impact shocks and vibrations resulting from snow plow use.

As best shown in FIG. 1, the dichroic mirror 90, having a polished front face and an unpolished back face, intercepts the light from the reflector 58 and reflects it so that it is redirected through the exit prism 108 and emerges from the prism 108 in a beam geometrically centered along an axis 7° above the horizontal.

Figure 5:
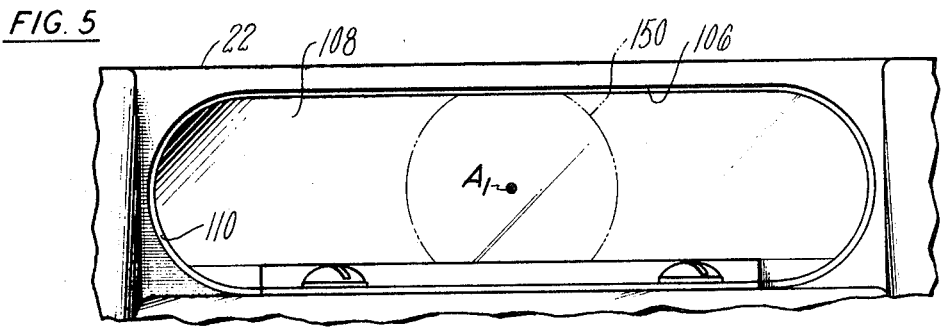
FIG. 5 is an enlarged fragmentary view taken along lines 5—5 of FIG. 1.

The mirror 90 is disposed substantially along the plane P which is located approximately midway between $F_1$ and $F_2$ where the aperture required to pass the light is minimum. As shown, the mirror 90 is slightly closer to $F_1$ than to $F_2$ and is so angled as to redirect the light received from reflector 58a and 58b in conical patterns substantially centered at $A_1$ in the exit prism 108 (FIG. 5).

As so located, the mirror 90 is positioned relative to the reflected rays from the reflector 58 so that the rays received from the reflector portion 58b are diverging at the plane of the mirror and the rays received from the reflector portion 58a are converging when striking the mirror. As diagrammatically illustrated in FIG. 5, the light beam emerging from the exit prism includes a central core 150 of light centered on $A_1$ which is reflected by reflector 58b.

In FIG. 2, the arrows representing the direction of the light rays by a mirror along plane P at points $D_2$, $C_2$, $B_2$, A (the central axis of the light beam), $C_1$, $D_1$, and $B_1$ indicate the directions of the light reflected by a mirror positioned along plane P. The light passing through plane P between $D_2$ and $C_2$ and $C_1$ and $D_1$ indicates the location of the light received from reflector portion 58a and the light passing through plane P between $B_2$ and $B_1$ indicates the location of the light received from reflector 58b and passing through plane P. Moreover, since the light reflected by elliptical reflecting surfaces 58a and 58b are projected as symmetrical cones on a plane perpendicular to their major axis, it is apparent that when projected on a plane P which is nonperpendicular (say, about 50°) the distances between $B_2$ and A and A and $B_1$ inversely represent the relative intensity of light received from reflector 58b and passing through plane P, and that the distances between $D_2$ and $C_2$ and $C_1$ and $D_1$ inversely represent the intensity of the light received from reflector 58a and passing through plane P.

Since the light from the reflector 58a is converging as it strikes flat mirror 90 positioned approximately in plane P, the light from reflector 58a continues to converge as it is redirected by the mirror 90 toward exit prism 108 so that a greater portion of the total light collected by reflector portion 58a passes through the prism. Thus in the light beam exiting the fixture outside the central core 150 (FIG. 5) the intensity is built up to exceed the 20,000 candela despite the reduced intensity of the light received from the filament by the reflector portion 58a.

Moreover, as shown by the arrows in FIG. 2, the higher intensity light received from reflector portion 58b and intercepted by the flat mirror 90 between $B_2$ and A forms the lower portion of the light beam exiting the fixture and the lower intensity light received from the reflector portion 58b and intercepted by the mirror 90 between A and $B_1$ forms the upper portion of the beam. As a result, the light exiting the fixture at an angle of 2° to 3° above ground where it is important for guidance has a higher intensity than the light exiting at 11° to 12° above ground where it is less important.

In addition, as indicated in FIG. 2, the intensity of the light from the reflector 58a intercepted by the mirror 90 between the points $D_2$ and $C_2$ is less than the intensity of the light from reflector 58a intercepted by the mirror between the points $C_1$ and $D_1$. This, coupled with the difference in the angles of reflection of this light resulting from the convergence of the light as it strikes mirror 90 results in a greater concentration of the light in the more useful lower portion of the output beam from the fixture in the portion of the beam outside the core 150 of the beam.

By virtue of the unique optical system of this invention, the amount of light forming a part of the useful light beam exiting the fixture is 30 per cent of the light generated by the filament as contrasted to the normal 10 to 20 per cent.

From the foregoing it is apparent that this invention provides a unique optical system utilizing a compound elliptical reflector for providing an airport guidance light of high efficiency and small size which is suitable for being embedded in a runway to increase the effective useful length of a runway for touchdown and take-off purposes.

As will be apparent to persons skilled in the art, various modifications, adaptations and variations of the foregoing specific disclosure can be made without departing from the teachings of the present invention.

I claim:

1. An optical system suited for an aircraft guidance light comprising a reflector having a plurality of substantially elliptical surface portions of different eccentricities axially displaced relative to each other to reflect light in the same general direction, the major axis and a focus of each of said elliptical surface portions being substantially coincident, the elliptical surface portion having the least eccentricity being disposed nearest to said focus and the conjugate focus of said elliptical surface portions being disposed on said major axis.

2. The system of claim 1 including a divergent light source disposed substantially at said focal point.

3. The system of claim 2 including means for adjusting said light source along said axis.

4. The system of claim 2 comprising two substantially elliptical surface portions and including a mirror disposed at an angle to said axis between the conjugate foci of said elliptical surface portions.

5. The system of claim 4 wherein said mirror is disposed substantially at midpoint between said foci where the aperture required for passing the reflected light from said elliptical surface portions is minimum.

6. The system of claim 4 wherein said mirror is flat and is disposed at an angle less than 45° relative to said axis.

7. The system of claim 4 wherein said elliptical surface portions comprise surfaces of revolution about said axis.

8. The system of claim 4 housed in a hermetically sealed container.

9. The system of claim 8 wherein the container is filled with a nonoxidizing gas.

10. The system of claim 9 wherein the gas in said container is maintained at a positive pressure.

11. The system of claim 8 wherein the container is provided with a light exit window having a width to height ratio greater than one.

12. The system of claim 11 wherein the exit window comprises a light refracting prism.

13. The system of claim 11 wherein an apertured opaque shield is interposed between said reflector and said mirror.

14. The system of claim 13 wherein the aperture of said shield has a contour generally corresponding with the contour of the exit window.

15. The system recited in claim 14 including heat dissipating means disposed between said container and said mirror adjacent the edges of said window.

16. The system of claim 13 wherein said elliptical surface portions are substantially surfaces of revolution about said axis.

17. The system of claim 1 wherein each of said elliptical surface portions comprises surfaces of revolution about said axis.

18. The system of claim 17 wherein said elliptical surface portions are joined together along a circle disposed in a plane perpendicular to said axis.

19. The system of claim 17 including a divergent light source located substantially at said focal point, the radius of gyration of each of said elliptical surface portions about said axis being increased by a fixed amount approximating the radius of said light source.

20. The system of claim 1 wherein each of said elliptical surface portions terminate axially at the point where the angles of light rays reflected therefrom form equal angles with said axis.

21. The system of claim 20 wherein each of said elliptical surface portions are joined to the next adjacent elliptical surface portion in a plane perpendicular to said axis, and a mirror is disposed at an angle to said axis between the conjugate foci of said elliptical surface portions.

22. The system of claim 21 wherein each of said elliptical surface portions are substantially surfaces of revolution about said axis.

* * * * *